United States Patent
Ju et al.

(10) Patent No.: US 12,545,125 B2
(45) Date of Patent: Feb. 10, 2026

(54) BATTERY MODULE, AND BATTERY PACK AND VEHICLE INCLUDING THE SAME

(71) Applicant: LG Energy Solution, Ltd., Seoul (KR)

(72) Inventors: Eun-Ah Ju, Daejeon (KR); Hyeon-Ki Yun, Daejeon (KR); Guenter Tannenberger, Pobenhausen (DE); Jan Janke, Brackenheim (DE); Uwe Harasztosi, Neckarsulm (DE)

(73) Assignee: LG Energy Solution, Ltd., Seoul (KR)

( * ) Notice: Subject to any disclaimer, the term of this patent is extended or adjusted under 35 U.S.C. 154(b) by 322 days.

(21) Appl. No.: 18/034,944

(22) PCT Filed: Jun. 7, 2022

(86) PCT No.: PCT/KR2022/008026
§ 371 (c)(1),
(2) Date: May 2, 2023

(87) PCT Pub. No.: WO2022/260407
PCT Pub. Date: Dec. 15, 2022

(65) Prior Publication Data
US 2023/0406119 A1    Dec. 21, 2023

(30) Foreign Application Priority Data
Jun. 8, 2021   (KR) .................. 10-2021-0074424

(51) Int. Cl.
*B60L 50/64* (2019.01)
*H01M 10/48* (2006.01)
(Continued)

(52) U.S. Cl.
CPC ........... *B60L 50/64* (2019.02); *H01M 10/482* (2013.01); *H01M 10/613* (2015.04);
(Continued)

(58) Field of Classification Search
CPC .................. B60L 50/64; B60L 2240/545; H01M 10/613; H01M 10/6567; H01M 10/482; H01M 2220/20
(Continued)

(56) References Cited

U.S. PATENT DOCUMENTS 11,888,125 B2 *   1/2024   You .................... H01M 50/507
2010/0104927 A1   4/2010   Albright
(Continued)

FOREIGN PATENT DOCUMENTS

CN    207021355 U    2/2018
CN    111162221 A    5/2020
(Continued)

OTHER PUBLICATIONS

International Search Report for Application No. PCT/KR2022/008026 mailed Sep. 14, 2022. 3 pages.
(Continued)

*Primary Examiner* — Hau V Phan
(74) *Attorney, Agent, or Firm* — Lerner David LLP (57) ABSTRACT

A battery module includes a sub module including a cell stack assembly having a plurality of battery cells; a module housing configured to accommodate the sub module; a front sealing plate configured to cover an opening at one longitudinal side of the module housing and having an inlet for introducing an insulating cooling liquid; a rear sealing plate configured to cover an opening at the other longitudinal side of the module housing and having an outlet for discharging the insulating cooling liquid; and a sensing assembly configured to sense voltage of the battery cell.

12 Claims, 10 Drawing Sheets

(51) Int. Cl.
  *H01M 10/613* (2014.01)
  *H01M 10/6567* (2014.01)
(52) U.S. Cl.
  CPC ... *H01M 10/6567* (2015.04); *B60L 2240/545* (2013.01); *H01M 2220/20* (2013.01)
(58) Field of Classification Search
  USPC ........................................................ 180/68.5
  See application file for complete search history.

(56)  References Cited

U.S. PATENT DOCUMENTS

| | | | |
|---|---|---|---|
| 2013/0029193 A1 | 1/2013 | Dyer et al. | |
| 2014/0220391 A1* | 8/2014 | Fujii ................... | H01M 50/264 429/7 |
| 2015/0144409 A1* | 5/2015 | Fujii ................... | H01M 50/519 429/121 |
| 2015/0188203 A1 | 7/2015 | Enomoto et al. | |
| 2015/0349390 A1* | 12/2015 | Aiba ................... | H01M 50/264 429/90 |
| 2016/0072112 A1 | 3/2016 | Smith et al. | |
| 2016/0141712 A1 | 5/2016 | Choi et al. | |
| 2017/0162923 A1 | 6/2017 | Deng et al. | |
| 2017/0190264 A1* | 7/2017 | Kim ................... | H01M 50/242 |
| 2017/0365888 A1* | 12/2017 | Kwon ............... | H01M 10/4207 |
| 2018/0138565 A1* | 5/2018 | Lee ................... | H01M 10/6554 |
| 2018/0205055 A1* | 7/2018 | Hilligoss ............. | H01M 10/443 |
| 2018/0212215 A1* | 7/2018 | Park ................... | H01M 10/425 |
| 2018/0261898 A1 | 9/2018 | Kellner et al. | |
| 2019/0181405 A1 | 6/2019 | Kim et al. | |
| 2019/0260099 A1* | 8/2019 | Ju ....................... | H01M 50/505 |
| 2019/0348720 A1* | 11/2019 | Oh ..................... | H01M 50/567 |
| 2019/0389318 A1* | 12/2019 | Lee .................... | H01M 50/516 |
| 2020/0020903 A1 | 1/2020 | Yun et al. | |
| 2020/0076025 A1 | 3/2020 | Jo et al. | |
| 2020/0203782 A1* | 6/2020 | Yoon .................. | H01M 10/425 |
| 2020/0266506 A1 | 8/2020 | Stuetz et al. | |
| 2020/0343604 A1* | 10/2020 | Lee .................... | H01M 50/553 |
| 2020/0388805 A1 | 12/2020 | Yoo et al. | |
| 2021/0104779 A1* | 4/2021 | Gao ................... | H01M 50/207 |
| 2021/0119309 A1 | 4/2021 | Jeong et al. | |
| 2021/0126314 A1* | 4/2021 | Masuda ............. | H01M 50/298 |
| 2021/0143508 A1* | 5/2021 | Yoshida ............. | H01M 50/291 |
| 2021/0175562 A1* | 6/2021 | Birkholz ........... | H01M 10/0481 |
| 2021/0313657 A1 | 10/2021 | Park et al. | |
| 2021/0376410 A1 | 12/2021 | Kang | |

FOREIGN PATENT DOCUMENTS

| | | |
|---|---|---|
| JP | 2009009853 A | 1/2009 |
| JP | 2012164456 A | 8/2012 |
| JP | 2014060088 A | 4/2014 |
| KR | 20170084522 A | 7/2017 |
| KR | 101821376 B1 | 1/2018 |
| KR | 101872833 B1 | 6/2018 |
| KR | 20190050672 A | 5/2019 |
| KR | 20190064887 A | 6/2019 |
| KR | 20200040619 A | 4/2020 |
| KR | 20200080076 A | 7/2020 |
| KR | 20210048855 A | 5/2021 |

OTHER PUBLICATIONS

Extended European Search Report including Written Opinion for Application No. 22820535.7 dated Aug. 5, 2024, pp. 1-8.

* cited by examiner

BATTERY MODULE, AND BATTERY PACK AND VEHICLE INCLUDING THE SAME

CROSS-REFERENCE TO RELATED APPLICATIONS

The present application is a national phase entry under 35 U.S.C. § 371 of International Application No. PCT/KR2022/008026 filed Jun. 7, 2022, which claims the benefit of Korean Patent Application No. 10-2021-0074424 filed on Jun. 8, 2021 with the Korean Intellectual Property Office, the entire contents of which are incorporated herein by reference.

TECHNICAL FIELD

The present disclosure relates to a battery module, and a battery pack and a vehicle including the battery module, and more specifically, to a battery module having a structure in which an insulating cooling liquid flowing into a module housing to cool a battery cell directly contact parts such as an electrode lead, a bus bar, etc. of the battery cell to cause efficient cooling. The insulating cooling liquid efficiently flows through a flow path between adjacent battery cells. A battery pack and a vehicle may include the battery module.

BACKGROUND ART

In the case of a battery module that uses indirect water cooling using a cooling water, the cooling performance is limited because the cooling water does not directly contact a battery cell, but rather indirectly contacts the battery cell through a module housing that houses the battery cell. In addition, because a cooling device such as a separate heatsink must be provided outside the module housing to form a flow path for cooling, the overall volume of the battery module is inevitably increased, which inevitably causes losses in terms of energy density.

In order to solve the problem of the indirect water-cooling method, a battery module having a cooling structure in which a cooling liquid is directly introduced into the module housing to directly contact the battery cell is desired.

DISCLOSURE

Technical Problem

The present disclosure is designed to solve the problems of the related art, and therefore the present disclosure is directed to providing a battery module having a structure in which an insulating cooling liquid is introduced into the battery module and directly contacts a battery cell and electrical connection parts to cause efficient cooling, such that the cooling liquid introduced into the battery module may flow smoothly.

In addition, the present disclosure is also directed to preventing a sensing line and a temperature sensor provided for sensing the voltage and temperature of the battery cell from being damaged by an insulating cooling liquid flowing inside the battery module, and enabling accurate temperature measurement.

However, the technical problems to be solved by the present disclosure are not limited to the above-described problems, and other problems not mentioned will be clearly understood by those skilled in the art from the present disclosure described below.

Technical Solution

A battery module according to an embodiment of the present disclosure comprises: a sub module including a cell stack assembly having a plurality of battery cells; a module housing configured to accommodate the sub module; a front sealing plate configured to cover an opening at one longitudinal side of the module housing and having an inlet for introducing an insulating cooling liquid; a rear sealing plate configured to cover an opening at the other longitudinal side of the module housing and having an outlet for discharging the insulating cooling liquid; and a sensing assembly configured to sense voltage of the battery cell.

The sensing assembly may be disposed on a top of the sub module.

The sensing assembly may include a sensing line electrically connected to the plurality of battery cells and extending from one longitudinal end of the battery cells to the other longitudinal end.

The sensing line may be interposed between a cell body portion of the battery cell and a cell wing portion folded toward the cell body portion.

The sensing assembly may further include a temperature sensor mounted on the sensing line.

The temperature sensor may be interposed between a cell body portion of the battery cell and a cell wing portion folded toward the cell body portion.

The cell stack assembly may further include a flow path spacer interposed between adjacent battery cells.

The flow path spacer may have a cooling liquid flow path extending along a longitudinal direction of the flow path spacer.

The sub module may further include a front bus bar frame assembly coupled to one longitudinal side of the cell stack assembly; and a rear bus bar frame assembly coupled to the other longitudinal side of the cell stack assembly.

The front bus bar frame assembly may include a bus bar frame; and a plurality of bus bars fixed on the bus bar frame and connected to an electrode lead of the battery cell.

The bus bar frame may have a cooling liquid hole.

The cooling liquid hole may be formed at a position corresponding to the flow path spacer.

Meanwhile, a battery pack and a vehicle according to an embodiment of the present disclosure comprises the battery module according to an embodiment of the present disclosure as described above.

Advantageous Effects

According to one aspect of the present disclosure, the insulating cooling liquid flows into the battery module and directly contacts the battery cell, and the cooling liquid introduced into the battery module may flow smoothly, thereby causing efficient and rapid cooling.

According to another aspect of the present disclosure, the sensing line and the temperature sensor provided for sensing the voltage and temperature of the battery cell may be prevented from being damaged by the insulating cooling liquid flowing inside the battery module, and accurate temperature measurements may be taken by the temperature sensor by minimizing the influence of the insulating cooling liquid in measuring the temperature of the battery cell.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF THE PREFERRED EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
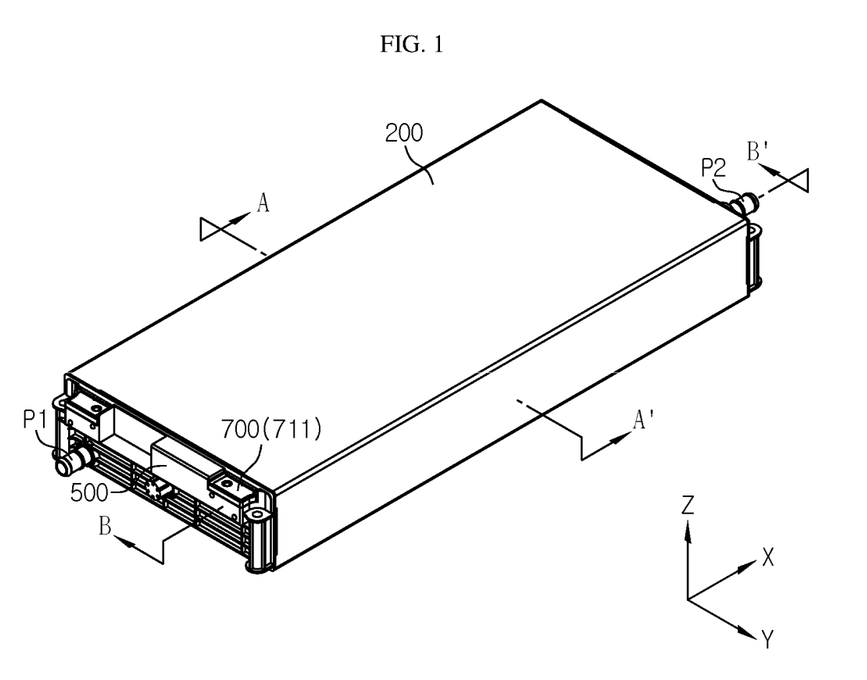
FIG. 1 is a perspective view of a battery module according to an embodiment of the present disclosure.
Figure 2:
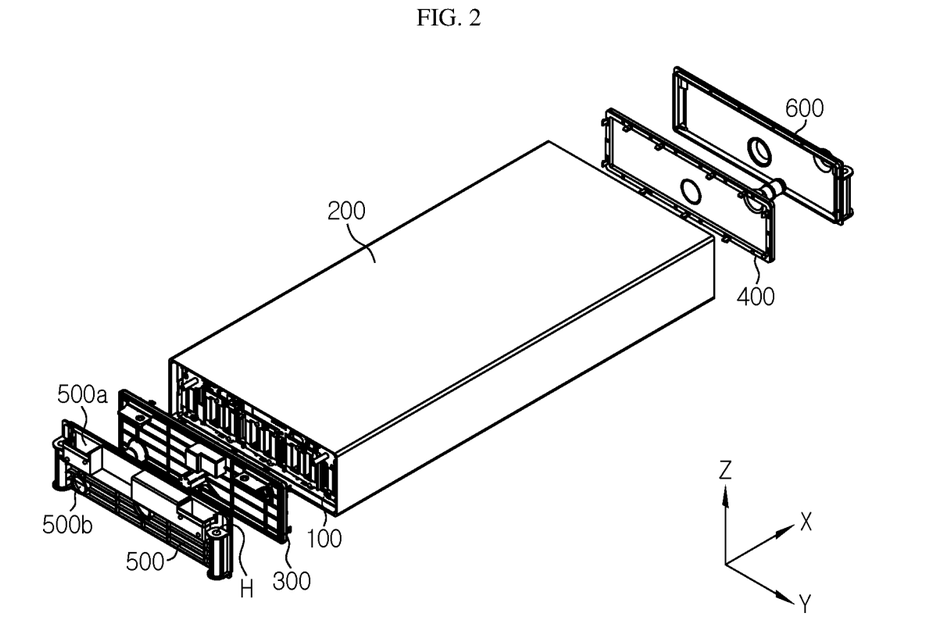
FIG. 2 is an exploded perspective view of a battery module according to an embodiment of the present disclosure.
Figure 4:
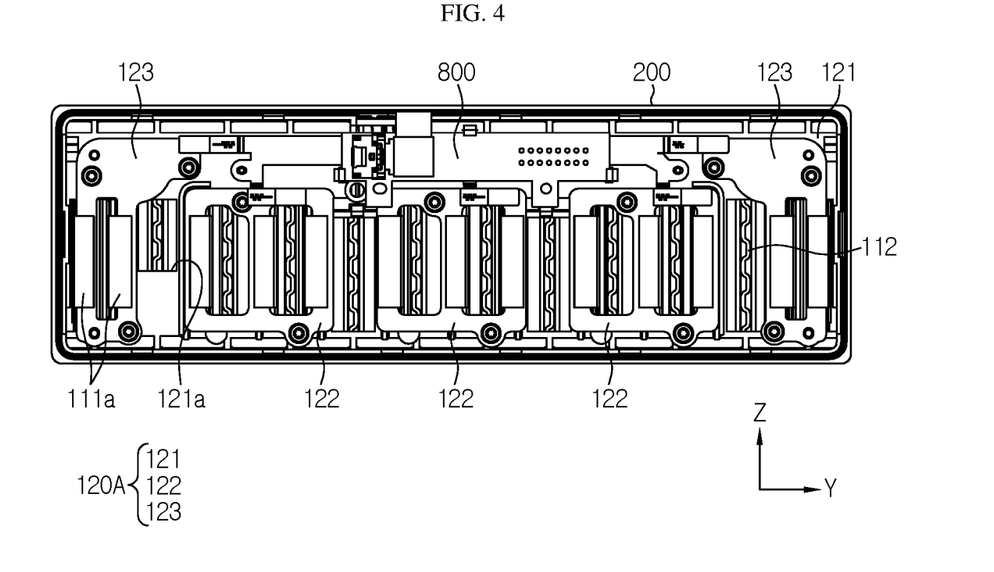
FIG. 4 is a front view of the battery module of FIG. 1 when the front end plate and the front sealing plate are removed.

Referring to FIGS. 1, 2 and 4, the battery module according to an embodiment of the present disclosure includes a sub module 100, a module housing 200, a front sealing plate 300, a rear sealing plate 400 and a sensing assembly 800. The battery module may further include a front end plate 500 and/or a rear end plate 600 and/or a pair of terminal assemblies 700 in addition to the above-described components.

Referring to FIGS. 2 to 6, the sub module 100 includes a cell stack assembly 110. The sub module 100 may further include a front bus bar frame assembly 120A and a rear bus bar frame assembly 120B in addition to the cell stack assembly 110.

The cell stack assembly 110 includes a plurality of battery cells 111. In addition, the cell stack assembly 110 may further include at least one flow path spacer 112 interposed between adjacent battery cells 111 and/or at least one buffer pad 113 interposed between the adjacent battery cells 111. The plurality of battery cells 111 are stacked in a vertical standing form on a surface parallel to the X-Y plane to form a single cell stack assembly 110. When the cell stack assembly 110 includes at least one flow path spacer 112 and/or at least one buffer pad 113, the spacer 112 and buffer pad 113 are also stacked in a vertical standing form on the surface parallel to the X-Y plane together with the plurality of battery cells 111 to form a single cell stack assembly 110.

The battery cell 111 may be a pouch-type battery cell having a pair of electrode leads 111a drawn out in opposite directions along the longitudinal direction (parallel to the X-axis) of the battery cell 111.

Referring to FIGS. 3 to 3b and FIGS. 5 and 6 together, the flow path spacer 112 includes a cooling liquid flow path 112a interposed between adjacent battery cells 111 such that the insulating cooling liquid introduced into the battery module may flow along the longitudinal direction (parallel to the X-axis) of the battery module. The cooling liquid flow path 112a may be provided in a plurality. The cooling liquid flow path 112a extends along the longitudinal direction (parallel to the X-axis) of the flow path spacer 112.

The flow path spacer 112 may be interposed between adjacent battery cells 111, respectively. In this embodiment, because one side and the opposing side of each of the battery cells 111 can be cooled by the flow path spacer 112, the cooling effect is advantageously maximized and the flow of the insulating cooling liquid introduced into the battery module becomes smoother.

In a different embodiment, the number of the flow path spacers 112 may be applied only by approximately one-half of the number of battery cells 111. Specifically, the plurality of flow path spacers 112 may be arranged such that a pair of battery cells 111 are positioned between a pair of adjacent flow path spacers 112. In this embodiment, only one of both sides of all the battery cells 111 is in contact with the flow path spacer 112. When the plurality of flow path spacers 112 are arranged in this embodiment, both the improvement of the cooling efficiency of the battery cells 111 and the improvement of the energy density may result.

Figure 3:
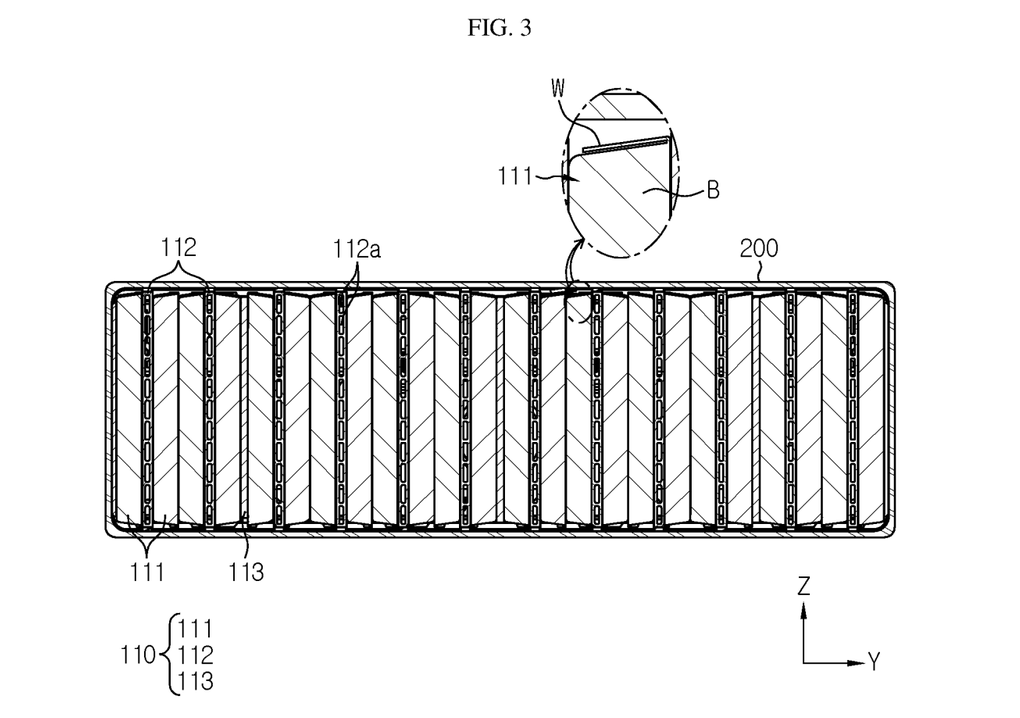
FIG. 3 is a cross section view taken along the line A-A' of FIG. 1.
Figure 5:
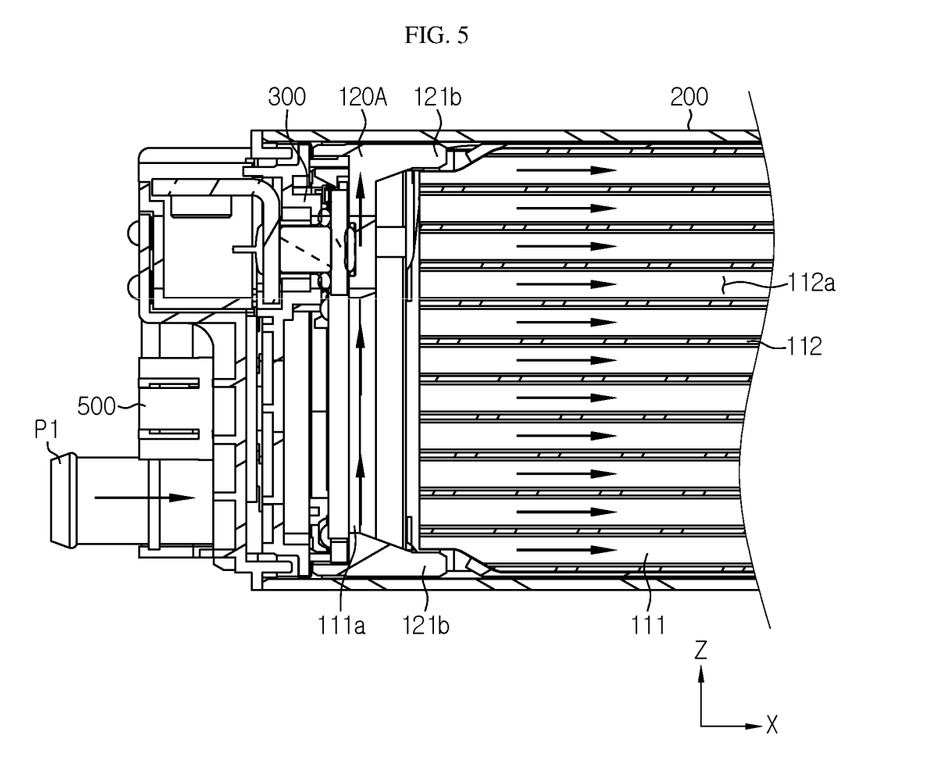
FIG. 5 is a side view of the flow of the insulating cooling liquid for cooling.
Figure 6:
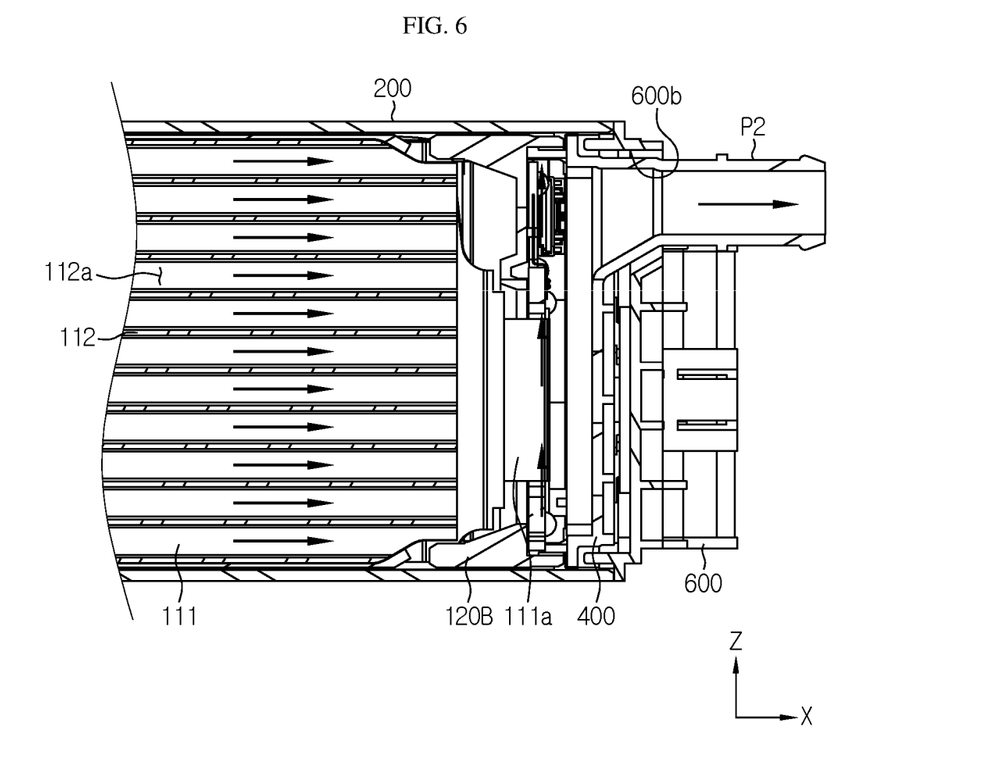
FIG. 6 is another side view of the flow of the insulating cooling liquid for cooling.

Referring to FIG. 3 together with FIGS. 5 and 6, the cooling liquid flow path 112a has a hole shape perforated along the longitudinal direction (parallel to the X-axis) of the flow path spacer 112. Therefore, the insulating cooling liquid flowing through the flow path spacer 112 does not directly contact the body of the battery cell 111, but indirectly contacts the body of the battery cell 111 through the flow path spacer 112. The cooling liquid flow path 112a may be provided in a plurality. In this embodiment, the cooling liquid flow paths 112a may be spaced apart from each other along the height direction (parallel to the Z-axis) of the flow path spacer 112.

Figure 3A:
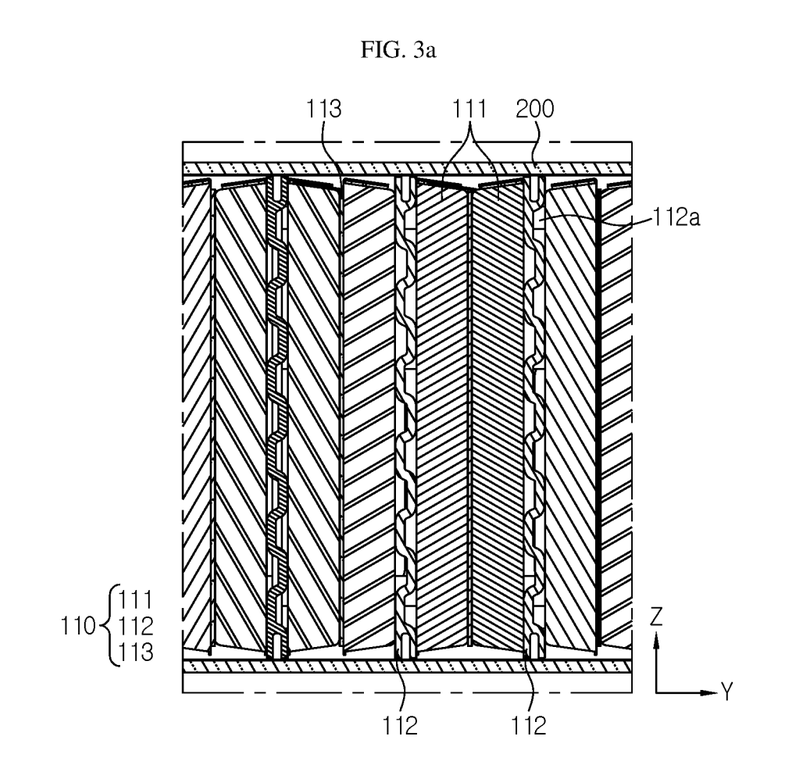
FIG. 3a is a front view of the cross section of FIG. 3 showing other embodiments of the flow path spacer.

Referring to FIG. 3a together with FIGS. 5 and 6, the flow path spacer 112 may have a shape that contacts both a first battery cell located at one side of the flow path spacer 112 and a second battery cell located at the other side of the flow path spacer 112 along the height direction (a direction parallel to the Z-axis) of the flow path spacer 112. In this case, the cooling liquid flow path 112a includes a first cooling liquid flow path formed between the flow path spacer 112 and the first battery cell and a second cooling liquid flow path formed between the flow path spacer 112 and the second battery cell. The first cooling liquid flow path and the second cooling liquid flow path are alternately formed along the height direction (parallel to the Z-axis) of the flow path spacer 112.

According to the structure of the flow path spacer 112 shown in FIG. 3a as described above, the insulating cooling liquid flowing through the first cooling liquid flow path directly contacts the first battery cell to cool the first battery cell. The insulating cooling liquid flowing through the second cooling liquid flow path directly contacts the second battery cell to cool the second battery cell.

Next, a structure of a flow path spacer having a shape different from that of the flow path spacer of FIG. 3a described above will be described with reference to FIG. 3b together with FIGS. 5 and 6.

Figure 3B:
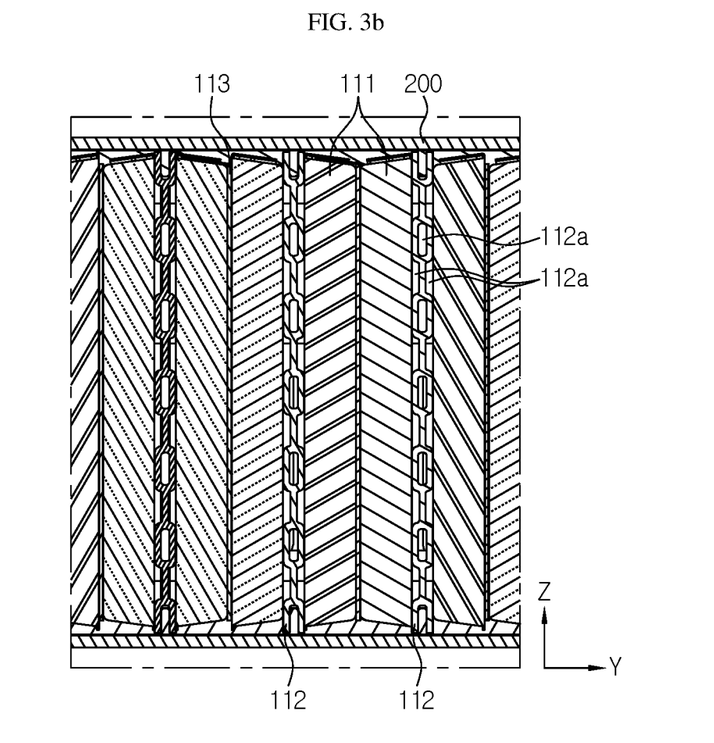
FIG. 3b is a front view of the cross section of FIG. 3 showing other embodiments of the flow path spacer.

The flow path spacer 112 shown in FIG. 3b includes a first portion spaced apart from both the first battery cell located at one side of the flow path spacer 112 and the second battery cell located at the other side of the flow path spacer 112, and a second portion in contact with both of the pairs of battery cells.

Continuing with this embodiment, the cooling liquid flow path 112a includes a first cooling liquid flow path formed between the first portion and the first battery cell and between the second portion and the second battery cell, respectively, and a second cooling liquid flow path surrounded by the second portion. The insulating cooling liquid flowing through the first cooling liquid flow path directly cools by contacting a cell body portion B of the battery cell 111, and the insulating cooling liquid flowing through the second cooling liquid flow path indirectly cools the cell body portion B of the battery cell 111. In addition, the first cooling liquid flow path and the second cooling liquid flow path are alternately formed along the height direction (parallel to the Z-axis) of the flow path spacer.

Meanwhile, in the present disclosure, the insulating cooling liquid used for cooling may be a cooling liquid with improved insulation, and, for example, an insulating oil may be used.

The buffer pad 113 may be interposed between adjacent battery cells 111 to absorb volume expansion due to swelling of the battery cells 111.

The front bus bar frame assembly 120A and the rear bus bar frame assembly 120B are coupled to both longitudinal sides (extending in a direction parallel to the X axis) of the cell stack assembly 110, so that a plurality of battery cells 111 are electrically connected. The front bus bar frame assembly 120A has substantially the same structure as the rear bus bar frame assembly 120B except that the inner terminal 123 is provided with the front bus bar frame assembly and the rear bus bar frame assembly 120B is not provided with the inner terminal 123. Accordingly, a detailed description of the specific structure of the rear bus bar frame assembly 120B will be omitted for brevity, and a detailed description of the specific structure of the front bus bar frame assembly 120A will be intensively described.

Referring to FIGS. 4 to 7, the front bus bar frame assembly 120A includes a bus bar frame 121 and a plurality of bus bars 122. In addition, the front bus bar frame assembly 120A may further include a pair of inner terminals 123. The bus bar frame 121 covers one side of the cell stack assembly 110 in the longitudinal direction (parallel to the X-axis).

The bus bar frame 121 includes a plurality of cooling liquid holes 121a. The cooling liquid hole 121a functions as a passage so that the insulating cooling liquid introduced into the module housing 200 through the inlet P1 provided in the front sealing plate 300 may flow toward the cell stack assembly 110 through the bus bar frame 121.

In consideration of this function, the cooling liquid hole 121a may be formed at a position corresponding to the flow path spacer 112 provided in the cell stack assembly 110. In addition, the cooling liquid hole 121a may have a size corresponding to that of the flow path spacer 112.

The cooling liquid introduced toward the cell stack assembly 110 through the cooling liquid hole 121a formed in the front bus bar frame assembly 120A flows toward the rear bus bar frame assembly 120B through the cooling liquid flow path 112a formed by the flow path spacer 112 in a direction along the arrow illustrated in FIGS. 5 and 6. The insulating cooling liquid that has flowed to the rear bus bar frame 120B flows toward the rear sealing plate 400 through the cooling liquid hole 121a formed in the rear bus bar frame 120B, and is emitted out of the battery module through the outlet P2 provided in the rear sealing plate 400. In this process, the insulating cooling liquid comes into direct contact with the electrode lead 111a of the battery cell 111 and the bus bar 122 and comes into either direct or indirect contact with the cell body portion B of the battery cell 111 to effectively cool the inside of the battery module.

The bus bar 122 is fixed on the bus bar frame 121 and is coupled to the electrode lead 111a drawn out through a lead slit formed in the bus bar frame 121 to electrically connect the plurality of battery cells 111. The bus bar 122 may include a cooling liquid hole formed at a position corresponding to the flow path spacer 112 so that the insulating cooling liquid may pass through the bus bar 122, similarly to the bus bar frame 121.

The inner terminal 123 is fixed on the bus bar frame 121 and is coupled to the electrode lead 111a of the battery cell 111 located at the outermost battery cell 111 among the battery cells 111 provided in the cell stack assembly 110. The inner terminal 123 functions as a high potential terminal. The inner terminal 123 located at one side of the longitudinal direction (parallel to the Y-axis) of the bus bar frame 121 functions as a positive electrode high potential terminal, and the inner terminal 123 located at the other longitudinal side of the bus bar frame 121 functions as a negative electrode high potential terminal. The inner terminal 123 is electrically connected to an outer terminal 710 (see FIGS. 8 and 9) to be described later.

The insulating cooling liquid flowing into the battery module may fill the space between the front sealing plate 300 and the front bus bar frame assembly 120A and may also fill the space between the rear sealing plate 400 and the rear bus bar frame assembly 120B. Accordingly, the insulating cooling liquid contacts the electrode lead 111a, the bus bar 122, and the inner terminal 123, which are components that can intensively generate heat, thereby efficiently cooling the battery module.

Figure 7:
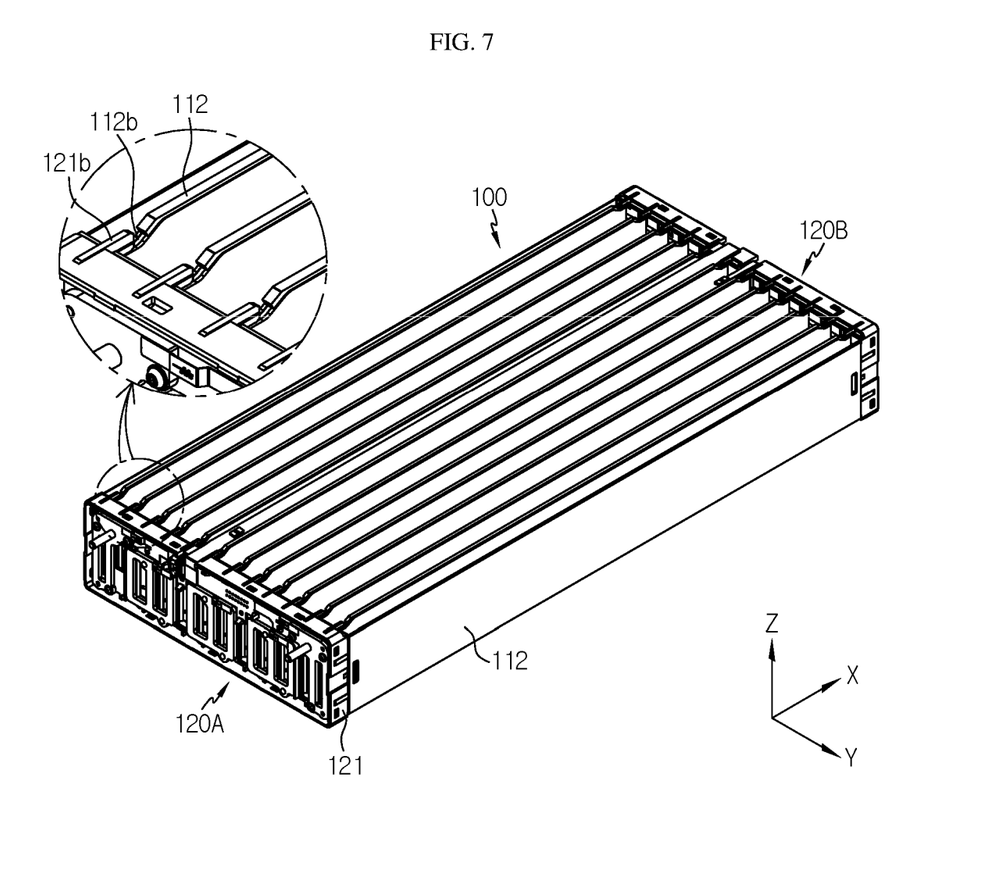
FIG. 7 is a perspective view of a coupling structure of a bus bar frame and a flow path spacer according to the present disclosure.

Referring to FIGS. 5, 6 and 7, the bus bar frame 121 of the front bus bar frame assembly 120A and the bus bar frame 121 of the rear bus bar frame assembly 120B may include a plurality of guide ribs 121b formed on the top and bottom along the longitudinal direction (parallel to the Y-axis). The guide rib 121b is shaped to extend in the direction toward the cell stack assembly 110. The guide rib 121b is formed at a position corresponding to the flow path spacer 112.

The fixing portion 112b having a shape corresponding to the guide rib 121b is formed at both ends of the flow path spacer 112 in the longitudinal direction (parallel to the X-axis). The movement of the flow path spacer 112 in the vertical direction (parallel to the Z-axis) and longitudinal direction (parallel to the X-axis) is restricted by the guide rib 121*b* and the fixing portion 112*b*. Accordingly, when the front bus bar frame assembly 120A and the rear bus bar frame assembly 120B are coupled to the cell stack assembly 110, the coupling position may be guided, thereby increasing the convenience of assembly.

Referring to FIGS. 1 to 6, the module housing 200 accommodates a sub module 100 including the cell stack assembly 110, the front bus bar frame assembly 120A, and the rear bus bar frame assembly 120B. The module housing 200 has at least two sides, at least one of the two sides being open in the longitudinal direction (parallel to the X-axis).

Referring to FIGS. 5, 6, 8 and 9, the front sealing plate 300 covers the opening formed at one side of the module housing 200 in the longitudinal direction (parallel to the X-axis). The front sealing plate 300 has an inlet P1 for inflow of the insulating cooling liquid. To prevent the insulating cooling liquid from leaking, a gasket G may be interposed between the edge surface of the front sealing plate 300 and the inner surface of the module housing 200 (see FIG. 9).

The front sealing plate 300 is provided with a pair of terminal holes 300*a* through which components for electrical connection between the inner terminal 123 provided in the front bus bar frame assembly 120A and the outer terminal 710 may pass. The terminal hole 300*a* is formed at a position on the front sealing plate 300 corresponding to the inner terminal 123.

Referring to FIG. 6, the rear sealing plate 400 covers the opening of the module housing 200 at the opposite side of the module relative to the front sealing plate 300 in the longitudinal direction (parallel to the X-axis), and has an outlet P2 for discharging the insulating cooling liquid. Like the front sealing plate 300, a gasket G may be interposed between the edge surface of the rear sealing plate 400 and the inner surface of the module housing 200 to prevent the insulating cooling liquid from leaking.

The front sealing plate 300 and rear sealing plate 400 may be made of an insulating resin for electrical insulation.

Figure 8:
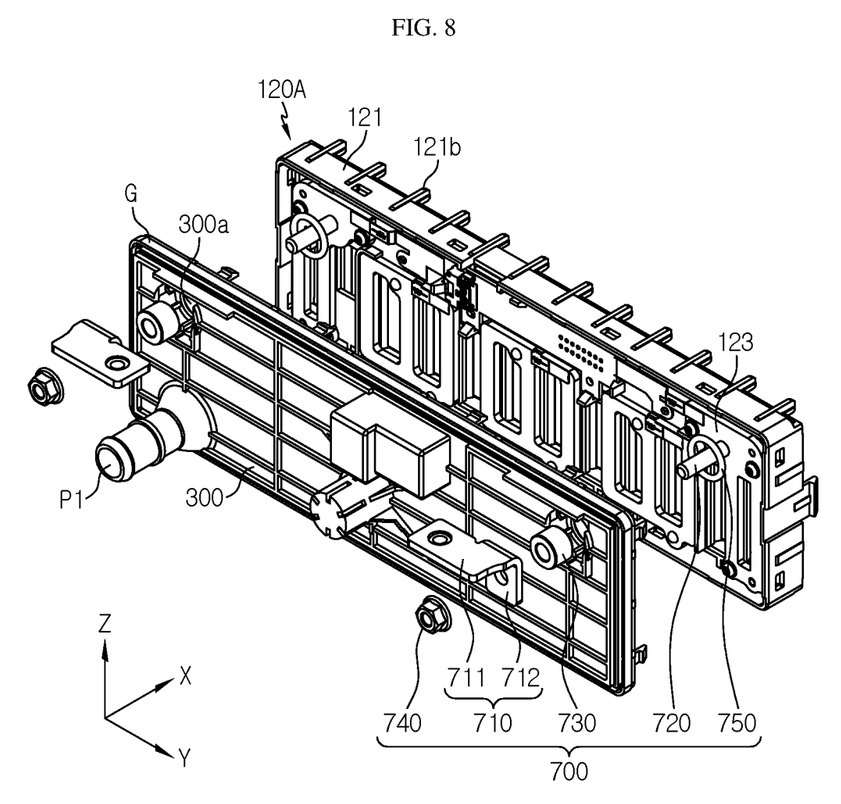
FIG. 8 is an exploded perspective view of a specific structure of a terminal assembly according to the present disclosure.
Figure 9:
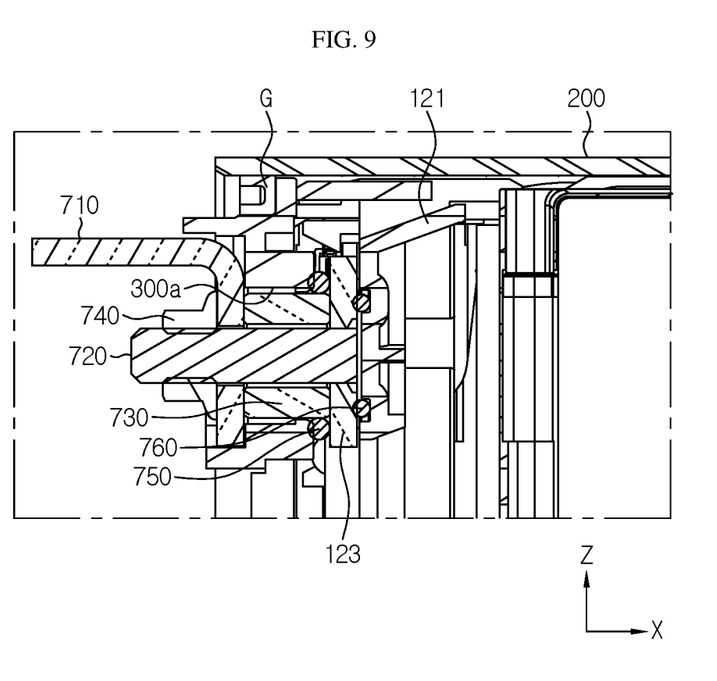
FIG. 9 is a side view of a portion of a specific structure of a terminal assembly according to the present disclosure.

Referring to FIGS. 8 and 9, the terminal assembly 700 includes an outer terminal 710 positioned on the outside of the front sealing plate 300 and a stud 720 electrically connecting the outer terminal 710 and the battery cell 111. The stud 720 is fixed to the inner terminal 123. The stud 720 may penetrate the inner terminal 123 and be fixed to the inner terminal 123 by press-fitting. When fixed to the inner terminal 123, the stud 720 is drawn out through the terminal hole 300*a* formed in the front sealing plate 300 and coupled with the outer terminal 710.

The terminal assembly 700 may further include a ring-shaped terminal spacer 730 inserted into the terminal hole 300*a* formed in the front sealing plate 300. The terminal spacer 730 may be made of a metal material. In embodiments where the terminal spacer 730 is provided, the stud 720 passes through the terminal spacer 730.

The terminal assembly 700 may further include a fastening nut 740 for fastening the outer terminal 710 to the stud 720. The fastening nut 740 is fastened to the stud 720, which penetrates the terminal spacer 730, and the fastening portion 712 of the outer terminal 710 so that the fastening portion 712 of the outer terminal 710 is tightly fixed to the terminal spacer 730. Accordingly, the inner terminal 123 and the outer terminal 710 are electrically connected to each other through the terminal spacer 730.

The terminal assembly 700 may further include a first O-ring 750 that covers the outer circumference of the terminal spacer 730 and is interposed between the inner surface of the front sealing plate 300 and the inner terminal 123. Referring to FIG. 9, the first O-ring 750 prevents the insulating cooling liquid introduced into the space between the front sealing plate 300 and the bus bar frame 121 from leaking to the outside of the front sealing plate 300 through the space between the inner surface of the terminal hole 300*a* and the terminal spacer 730.

In addition, the terminal assembly 700 may further include a second O-ring 760 positioned around the stud 720, which is press-fitted into the inner terminal 123 and exposed to the space between the inner terminal 123 and the bus bar frame 121, and is interposed between the inner terminal 123 and the bus bar frame 121. The second O-ring 760 prevents the insulating cooling liquid introduced into the space between the front sealing plate 300 and the bus bar frame 121 from leaking to the outside of the front sealing plate 300 through the space between the inner terminal 123 and the stud 720 and the space between the inner surface of the terminal spacer 730 and the stud 720.

Referring to FIGS. 1 and 2 and FIGS. 5 and 6, the front end plate 500 covers the front sealing plate 300 and is fixed to the module housing 200. The rear end plate 600 covers the rear sealing plate 400 and is fixed to the module housing 200.

The front end plate 500 includes a terminal exposing portion 500*a* for exposing the connection portion 711 of the outer terminal 710 to the outside of the front end plate 500, and an inlet exposing portion 500*b* for exposing the inlet P1 to the outside of the front end plate 500. The rear end plate 600 includes an outlet exposing portion 600*b* for exposing the outlet P2 to the outside of the rear end plate 600.

When the front end plate 500 and the rear end plate 600 are fixed to the module housing 200, a gasket for preventing the insulating cooling liquid from leaking may be interposed in the coupling area between the front end plate 500 and the module housing 200 and the coupling area between the rear end plate 600 and the module housing 200.

Figure 10:
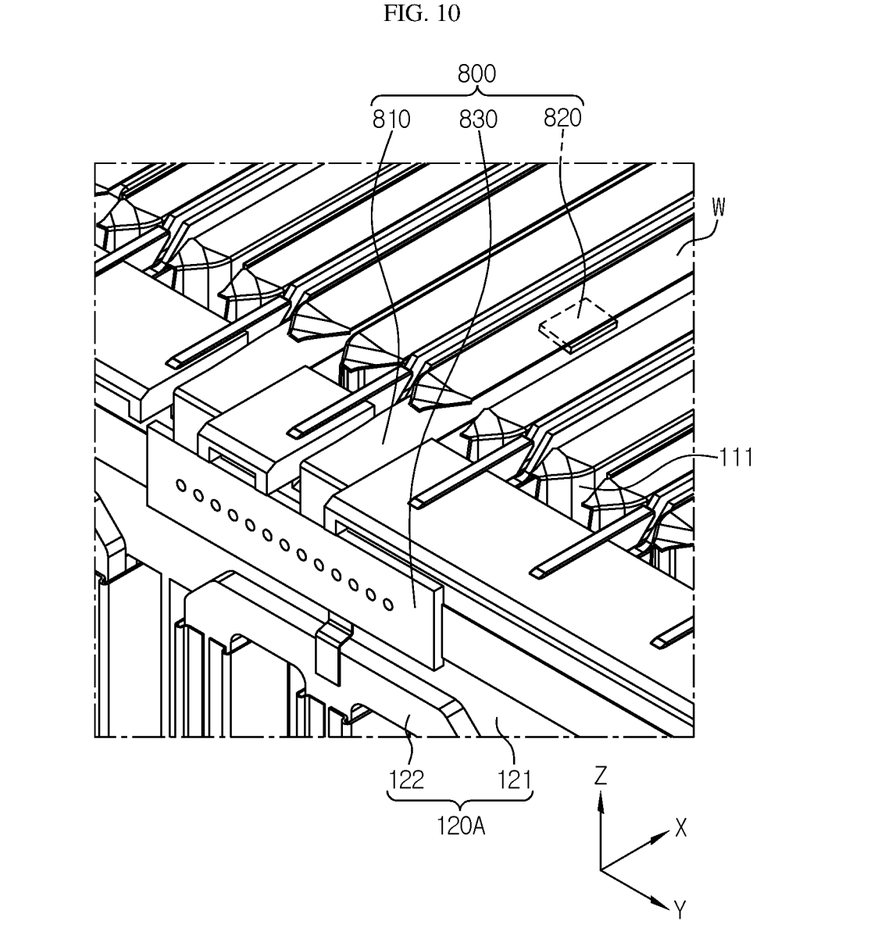
FIG. 10 is an enlarged perspective view of an arrangement structure of a sensing assembly according to the present disclosure.

Referring to FIGS. 3, 4, and 10, the sensing assembly 800 is disposed on the top of the sub module 100 and senses the voltage of the battery cell 111. The sensing assembly 800 includes a sensing line 810 electrically connected to the plurality of battery cells 111 and extending from one end of the battery cell 111 in the longitudinal direction (parallel to the X-axis) to the other longitudinal end. The sensing line 810 is electrically connected to the battery cells 111 along both sides of the cell stack assembly 110 in the longitudinal direction (parallel to the X-axis). Coupling the sensing line 810 to the bus bar 122 causes the electrical connection between the sensing line 810 and the battery cell 111. The sensing line 810 may also be directly coupled to the electrode lead 111*a* of the battery cell 111.

The sensing line 810 may be interposed between the cell body portion B of the pouch-type battery cell 111 and the cell wing portion W folded toward the cell body portion B. This arrangement prevents the sensing line 810 from being damaged by the insulating cooling liquid flowing inside the battery module. When the battery cell 111 is a pouch type, an area in which an electrode assembly (not shown) is accommodated may be defined as the cell body portion B, and a region elongated along the longitudinal direction (parallel to the X-axis) of the battery module in the sealing area formed around the cell body portion B may be defined as the cell wing portion W.

The sensing assembly 800 may additionally perform the function of sensing the temperature of the battery cell 111 in addition to sensing the voltage. To this end, the sensing assembly 800 may further include at least one temperature sensor 820 mounted on the sensing line 810. The temperature sensor 820 may be disposed adjacent to an electrode lead 111*a* having a large heat generation. Like the sensing line 810, the temperature sensor 820 may be interposed between the cell body portion B of the battery cell 111 and the cell wing portion W folded toward the cell body portion B. This arrangement prevents the temperature sensor 820 from being damaged by the insulating cooling liquid flowing inside the battery module. In addition, this arrangement prevents or minimizes the contact between the temperature sensor 820 and the insulating cooling liquid so that the temperature of the battery cell 111 can be accurately sensed.

The sensing assembly 800 may further include a printed circuit board (PCB) 830 electrically connected to the sensing line 810. The PCB 830 may be fixed on the bus bar frame 121. A connector assembly (not shown) may be mounted on the PCB 830, and a control device such as a battery management system (BMS) (not shown) may be connected through this connector assembly. In this embodiment, the BMS may measure and/or receive information about the voltage, temperature, etc. of the battery cell 111 and control charging/discharging of the battery module in accordance with the information received.

A battery pack according to an embodiment of the present disclosure includes the battery module according to the present disclosure as described above. The battery pack may further include additional components such as a pack housing and/or a battery management system (BMS) together with at least one battery module according to the present disclosure.

In one embodiment, the battery module may be fastened to the pack housing through the fastening hole H formed in the front end plate 500 and/or the rear end plate 600. That is, the fastening hole H may provide a space into which a fastener, such as a bolt for fastening the pack housing and the battery module, is inserted. Alternatively, when the battery pack includes a plurality of battery modules, the plurality of battery modules may be fastened to each other through the fastening hole H formed in the front end plate 500 and/or the rear end plate 600.

A vehicle according to an embodiment of the present disclosure may include at least one battery module and/or the battery pack as described above. The vehicle according to an embodiment of the present disclosure may be, for example, a hybrid vehicle or an electric vehicle that operates by being powered by the battery module and/or the battery pack of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF REFERENCE NUMERALS

100: sub module
110: cell stack assembly
111: battery cell
111*a*: electrode lead
B: cell body portion
W: cell wing portion
112: flow path spacer
112*a*: cooling liquid flow path
112*b*: fixing portion
113: buffer pad
120A: front bus bar frame assembly
120B: rear bus bar frame assembly
121: bus bar frame
121*a*: cooling liquid hole
121*b*: guide rib
122: bus bar
123: inner terminal
200: module housing
300: front sealing plate
300*a*: terminal hole
P1: inlet
G: gasket
400: rear sealing plate
P2: outlet
500: front end plate
500*a*: terminal exposing portion
500*b*: inlet exposing portion
600: rear end plate
600*b*: outlet exposing portion
700: terminal assembly
710: outer terminal
711: connection portion
712: fastening portion
720: stud
730: terminal spacer
740: fastening nut
750: first O-ring
760: second O-ring
800: sensing assembly
810: sensing line
820: temperature sensor
830: PCB (Printed Circuit Board)

What is claimed is:

1. A battery module, comprising:
   a sub module including a cell stack assembly having a plurality of battery cells;
   a module housing configured to house the sub module;
   a front sealing plate configured to cover an opening at a first longitudinal side of the module housing and having an inlet for introducing an insulating cooling liquid;
   a rear sealing plate configured to cover an opening at a second longitudinal side of the module housing opposed the first longitudinal side and having an outlet for discharging the insulating cooling liquid; and
   a sensing assembly configured to sense a voltage of at least one battery cell of the plurality of battery cells,
   wherein the cell stack assembly further includes a flow path spacer interposed between adjacent battery cells, and
   wherein the flow path spacer has a cooling liquid flow path extending along a longitudinal direction of the flow path spacer.

2. The battery module according to claim 1, wherein the sensing assembly is disposed on a top of the sub module.

3. The battery module according to claim 1, wherein the sensing assembly includes a sensing line electrically connected to the plurality of battery cells and extending from the first longitudinal end of the battery cells to the second longitudinal end.

4. The battery module according to claim 3, wherein the sensing line is interposed between a cell body portion of the battery cell and a cell wing portion folded toward the cell body portion.

5. The battery module according to claim 3, wherein the sensing assembly further includes a temperature sensor mounted on the sensing line.

6. The battery module according to claim 5, wherein the temperature sensor is interposed between a cell body portion of the battery cell and a cell wing portion folded toward the cell body portion.

7. The battery module according to claim 1, wherein the sub module further includes:
- a front bus bar frame assembly coupled to a first longitudinal side of the cell stack assembly; and
- a rear bus bar frame assembly coupled to a second longitudinal side of the cell stack assembly, the second longitudinal side opposed to the first longitudinal side.

8. The battery module according to claim 7, wherein the front bus bar frame assembly includes:
- a bus bar frame; and
- a plurality of bus bars fixed on the bus bar frame and connected to an electrode leads of the plurality of battery cells.

9. The battery module according to claim 8, wherein the bus bar frame includes a cooling liquid hole.

10. The battery module according to claim 9, wherein the cooling liquid hole is formed at a position corresponding to the flow path spacer.

11. A battery pack comprising the battery module according to claim 1.

12. A vehicle comprising the battery module according to claim 1.

* * * * *